2 Sheets--Sheet 1.

T. HEAD.
Potato-Digging Machine.

No. 160,593.　　　　　　　　　　　Patented March 9, 1875.

Witnesses:　　　　　　　　　　　Inventor:
William Arthur Edwards.　　　　　Thos. Head
Walter Bastable.

THE GRAPHIC CO. PHOTO-LITH. 39 & 41 PARK PLACE, N.Y.

2 Sheets--Sheet 2.

T. HEAD.
Potato-Digging Machine.

No. 160,593. Patented March 9, 1875.

Attest:
Nathaniel Gunning
Joseph H. Campbell

Inventor:
Thomas Head
by his Attorney
Wm. A. Edward

THE GRAPHIC CO.PHOTO-LITH.39 & 41 PARK PLACE, N.Y.

UNITED STATES PATENT OFFICE.

THOMAS HEAD, OF COPETOWN, BEVERLY TOWNSHIP, WENTWORTH COUNTY, CANADA.

IMPROVEMENT IN POTATO-DIGGING MACHINES.

Specification forming part of Letters Patent No. 160,593, dated March 9, 1875; application filed December 15, 1874.

*To all whom it may concern:*

Be it known that I, THOMAS HEAD, of the village of Copetown, in the township of Beverly, in the county of Wentworth, in the Province of Ontario, Canada, have invented a Potato-Digging Machine, of which the following is a specification:

The object of my invention is to dig potatoes and separate the earth from the same, and leave them on the surface of the ground ready to be gathered; and consists of the combination of shaking grated mold-board B, attached to plowshare A, by means of pins 1 2 3 4 5 6 7, on which the bars of the grate B move or shake from left to right of the plow or digger, the top end of bars being connected by a bar, J, with pins, as at the bottom, and supported, by slide-bar E, to the outer bar of the grate B, and underneath the connecting-rod F, being attached from the crank G on shaft H, which revolves in long bearing I, (or it may have two bearings,) being driven by the wheels and gear of a mowing or other machine, which is connected to the shaft H by means of a short shaft and universal couplings.

Figure 1:
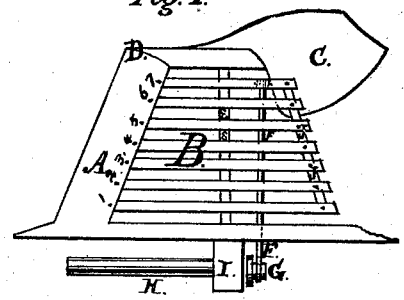
Figure 2:
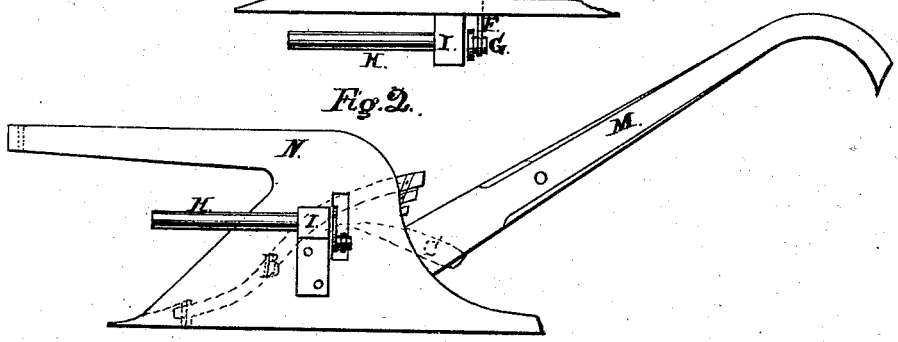
Figure 3:
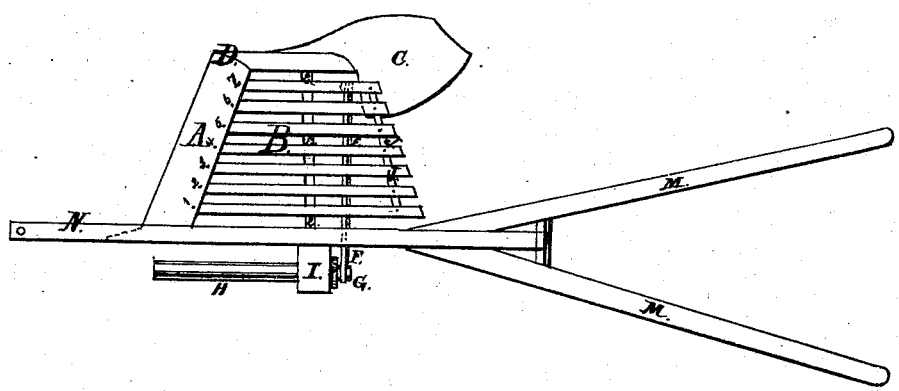
Figure 4:
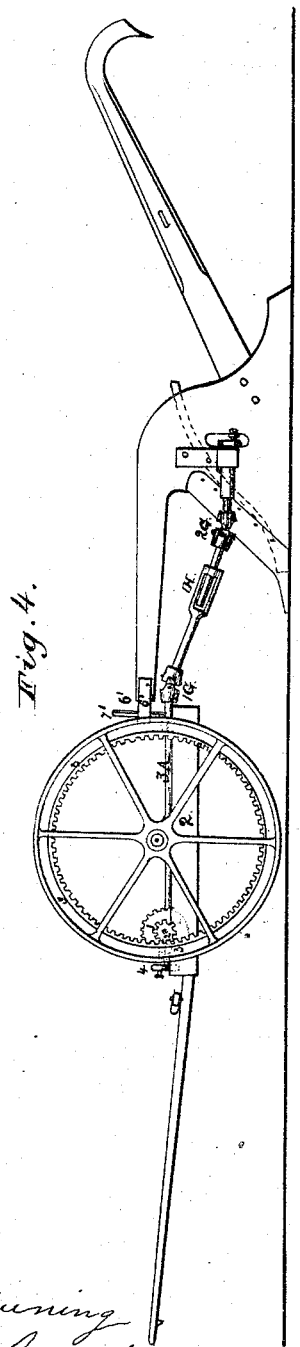
Figure 5:

Figure 1 is a plan of the combination of parts named above. Fig. 2 is a side elevation. Fig. 3 is a plan, and Fig. 4 a side elevation, of the potato-digger attached to the mowing-machine by the wrought-iron beam-loop 6' of digger and wrought-iron pin 7', which is secured on the back end of mowing-machine frame by two bolts, thus allowing the digger to rise or fall, and also serving as a joint on turning the machine in the field. Then, again, the short shaft on the side of the digger is coupled to the back end of the crank-shaft 3 A (which works the knives of the mowing-machine) by the universal couplings 1 G and 2 G and the extension-shaft 1 H, parts of which are enlarged and shown in Fig. 5, which is in two parts, one being a looped shaft, with a square hole in the end, $z$, into which slides the square shaft Y. This is to give all the pull of the horses to the pin 7' and loop C', the digger receiving from thence all the pull given, and also to take the strain from those parts which work the shaking grated mold-board.

When the mower is attached to the digger or plow the cutter-bar is taken away, and the crank is freed from the connecting-rod which works the knives, leaving it free to revolve.

When the plow is put in motion the shaft H commences to revolve, and the grated mold-board riddles the earth from the potatoes, which are forced, by the fresh earth, to the inclined spout C, which discharges the potatoes in rows for picking.

I claim as my invention—

The combination, in a potato-digging machine, substantially as described, of shaking grated mold-board B with outside cutter D, a continuation of which forms the spout C, substantially as described.

THOS. HEAD.

Witnesses:
WILLIAM ARTHUR EDWARDS,
WALTER BASTABLE.